United States Patent [19]
Bergen

[11] Patent Number: 5,872,867
[45] Date of Patent: *Feb. 16, 1999

[54] METHOD AND APPARATUS FOR GENERATING IMAGE TEXTURES

[75] Inventor: James R. Bergen, Hopewell, N.J.

[73] Assignee: Sarnoff Corporation, Princeton, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 511,258

[22] Filed: Aug. 4, 1995

[51] Int. Cl.$^6$ .............................. G06K 9/00; G06K 9/36; G06K 9/40
[52] U.S. Cl. ........................ 382/254; 382/130; 382/168; 382/285; 348/571
[58] Field of Search .................................... 382/254, 168, 382/108, 285; 395/125, 130; 348/571

[56] References Cited

U.S. PATENT DOCUMENTS

| | | | |
|---|---|---|---|
| 5,148,497 | 9/1992 | Pentland et al. | 382/249 |
| 5,544,292 | 8/1996 | Winser | 395/130 |

OTHER PUBLICATIONS

Cadzow, James, "Image Texture Synthesis–by–Analysis Using Moving–Average Models", Oct. 1993 pp. 1110–1122.
International Search Report mailed Feb. 13, 1997 for corresponding application No. PCT/US/96/12714.
Lewis, "Texture Synthesis for Digital Painting", Computer Graphics, pp. 245–251, vol. 18, No. 3, Jul. 1984.
Perlin, "An Image Synthesizer", Proceedings of SIGGRAPH '85, pp. 333–342, vol. 19, No. 3, Jul. 22–26, 1985.
Ogden et al., "Pyramid–based Computer Graphics", RCA Engineer, 30–5, Sep./Oct./ 1985.
Popat et al., "Novel Cluster–based Probability Model For Texture Synthesis, Classification, and Compression", Proc. of SPIE Visual Communications and Image Processing '93, Boston, Nov. 8–11, 1993.
"Image Texture Synthesis–by–Analysis Using Moving–Average Models", James A. Cadzow, IEEE, vol. 29, No. 4 Oct. 1993.

*Primary Examiner*—Leo H. Boudreau
*Assistant Examiner*—Daniel G. Mariam
*Attorney, Agent, or Firm*—William J. Burke

[57] ABSTRACT

A method and apparatus for synthesizing texture images that match the texture appearance of a given digitized sample of an image. This synthesis is completely automatic and requires only the "target" texture image as an input. It allows generation of as much texture as desired so that any object or surface can be covered with the synthesized texture. The apparatus generates texture parameters for the target texture sample image that reflect the texture in that image. These texture parameters are used to modify the noise image such that the modified noise image attains the texture of the target texture image. To further improve the texture of the modified noise image, an image pyramid is constructed for both the modified noise image and the target texture sample image. The apparatus then iteratively updates the modified noise image on a coarse-to-fine basis using the subbands of the image pyramids. The output image is an updated modified noise image that has attained the texture of the target texture sample image.

17 Claims, 4 Drawing Sheets

METHOD AND APPARATUS FOR GENERATING IMAGE TEXTURES

The invention relates to techniques for image processing. More particularly, the invention relates to a method and apparatus for generating image textures.

BACKGROUND OF THE DISCLOSURE

Generally speaking, computer renderings of objects with surface texture are more interesting and realistic than those without texture. Texture mapping is a technique that adds an appearance of surface detail by wrapping or projecting a digitized texture image onto a computer generated surface. Digitized textures can be obtained from a variety of sources, e.g., cropped from a photo CD image as a texture "chip", but the resulting texture chip may not have a desired size or shape corresponding to a surface that is to be textured. Furthermore, to cover a large object, an image rendering system may need to repeat the texture; this can lead to unacceptable artifacts either in the form of visible seams, visible repetition, or both.

Texture mapping suffers from an additional fundamental problem; often there is no natural map from the (planar) texture image to the geometry/topology of the surface, so the texture may be distorted unnaturally when mapped. There are some partial solutions to this distortion problem but there is no universal solution for mapping an image onto an arbitrarily shaped surface.

An alternative to texture mapping is to create (paint) textures by hand directly onto a computer generated, three-dimensional surface model, but this process is both labor intensive and requires considerable artistic skill.

Another alternative is to use computer-synthesized textures so that as much texture can be generated as needed to cover a particular surface. Furthermore, some of the synthesis techniques produce textures that tile seamlessly.

Using synthetic textures, the distortion problem has been solved in two different ways. First, some techniques work by synthesizing texture directly on the object surface. The second solution is to use so-called "solid textures". A solid texture is a three-dimensional array of color values. A point on the surface of an object is colored by the value of the solid texture at the corresponding three-dimensional point. Solid texturing can be a very natural solution to the distortion problem; there is no distortion because there is no mapping. However, existing techniques for synthesizing solid textures can be quite cumbersome. One must learn how to "tweak" the parameters or procedures of the texture synthesizer to get a desired effect.

Therefore, a need exists in the art for a method and apparatus for generating textures that can cover, without seams or significant distortion, surfaces of any size.

SUMMARY OF THE INVENTION

The present invention overcomes the disadvantages heretofore associated with the prior art by synthesizing image textures using an apparatus and a concomitant method that synthesizes a texture of any size and shape from a given texture chip. Specifically, the apparatus generates a histogram of an input image (a texture chip) that represents texture parameters defining the texture properties of the input image, generates a histogram of a noise image having any size and shape, matches the noise image histogram to the input image histogram, and modifies the noise image such that the modified noise image has a histogram that is the same as the histogram of the input image. The resultant modified noise image contains a texture that resembles the texture of the input image.

Further refinement of the texture in the modified noise image is accomplished by generating an image pyramid for the input image and an image pyramid for the modified noise image. Thereafter, a histogram is generated for each subband in each of the pyramids and the histogram of the coarsest subband in the image pyramid of the modified noise image is matched to the histogram of the coarsest subband in the image pyramid of the input image. Once matched, the apparatus iterates, i.e., coarsest to finest, to the next subband in each image pyramid and matches the histograms in each of the subbands. Ultimately, the apparatus modifies each image pyramid subband of the modified noise image such that each subband now has a histogram substantially identical to the histogram of the equivalent subband in the image pyramid of the input image. The pyramid for the modified noise image is then collapsed to generate a newly modified (improved) noise image that better reflects the texture of the input image. The output image is a texture image having the texture properties of the input image and a size and shape defined by the size and shape of the noise image.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention is apparatus and a concomitant method for synthesizing an image (or solid texture) that matches the appearance of a given texture sample, e.g., a texture chip. One advantage of this invention is that it generates a texture for any size surface entirely from the texture sample, requiring no additional information or adjustment. The invention begins with a digitized image (e.g., the texture chip) and analyzes this input image to compute a number of texture parameter values. Those parameter values are then used to synthesize a new (output) image of any size that looks (in its color and texture properties) like the input image. The analysis phase is inherently two-dimensional and, as such, the output image is typically two-dimensional. Nonetheless, in a three-dimensional application of the invention, the output image is a solid texture such that planar slices through the solid have a texture like the original input image. In either case, the (two-dimensional or three-dimensional) texture is synthesized so that it tiles seamlessly.

Figure 1:
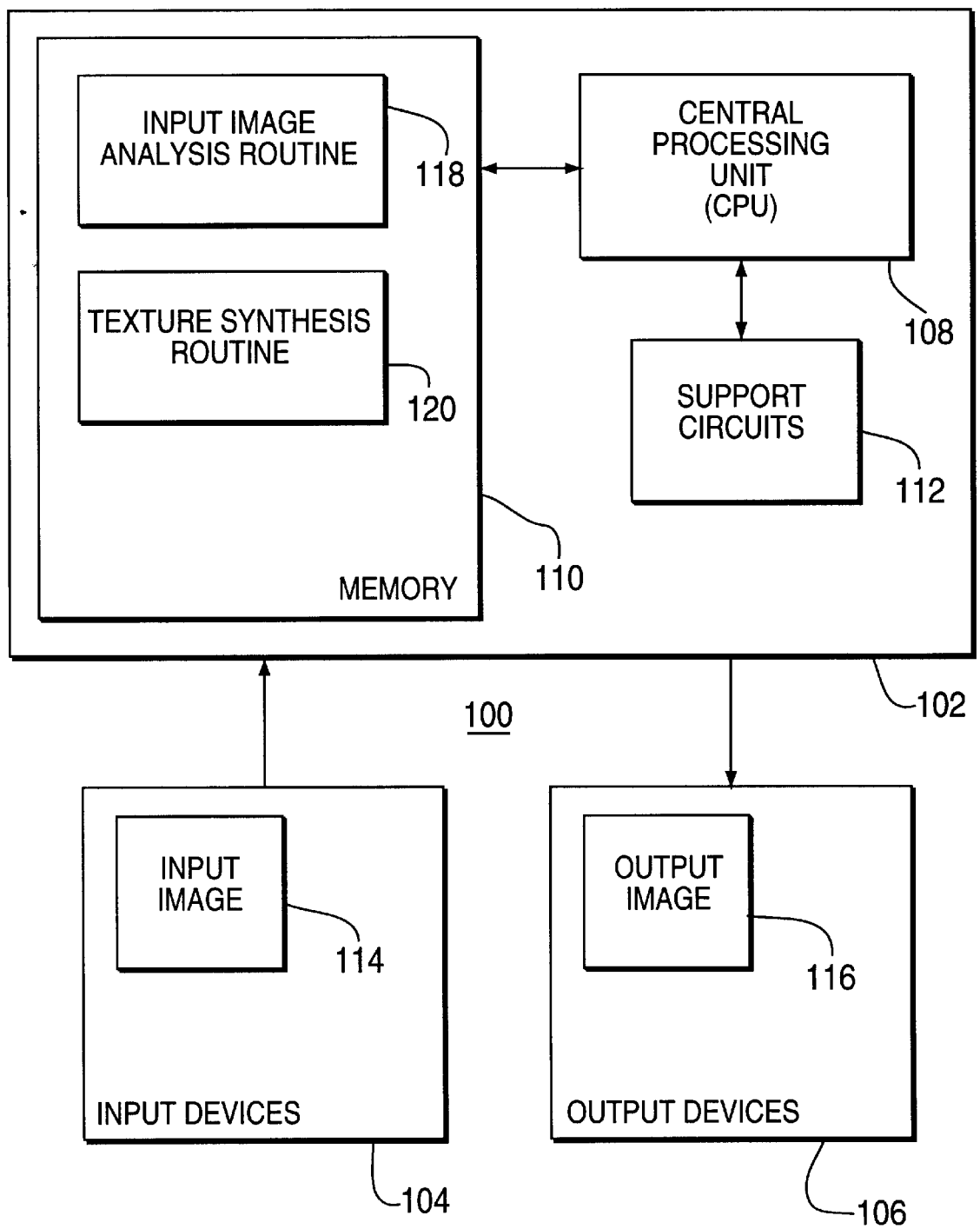
FIG. 1 is a high-level block diagram of a computer system used to execute the software routine(s) that implement the present invention.

FIG. 1 depicts a computer system 100 which executes software routines that form an illustrative implementation of the invention. Execution of the software routines configure the computer system as an apparatus for generating image textures from an input image representing a sample of a texture that is to be generated within an output image of any shape and size. Specifically, the system 100 comprises a computer 102 and one or more input and output devices 104 and 106 for the computer. The computer may be a general purpose computer having a central processing unit (CPU) 108 that is programmed to function in a certain manner by executing one or more programs residing in memory 110 (e.g., random access memory, floppy disk, hard disk and the like). The CPU functions in conjunction with well-known support circuits 112 such as read only memory, power supplies, co-processors, and the like. The computer system is controlled by conventional input devices, such as a mouse, keyboard, trackball and the like, and displays information via conventional output devices, such a computer graphics display, printer, plotter and the like. Although the input image (e.g., the texture chip) may be stored in memory and recalled for use by the system, typically, the input devices include a conventional image scanner that converts a photograph, a frame of a video image, or half-tone image (or portion thereof) into a digital image (input image 114). The display devices, on the other hand, display the output image 116 as a stand-alone image or as a texture applied to a surface in a graphical image.

In response to user commands applied to the computer via the input devices, the CPU executes an input image analysis routine 118 that produces the texture parameters and a texture synthesis routine 120 that generates the output image 116 from the texture parameters. The output image may be displayed or incorporated into another image using a conventional image rendering software routine.

A. Texture Models

Textures have often been classified into two categories, deterministic textures and stochastic textures. A deterministic texture is characterized by a set of primitives and a placement rule (e.g., a tile floor). A stochastic texture, on the other hand, does not have easily identifiable primitives (e.g., granite, bark, sand). Many real-world textures have some mixture of these two characteristics (e.g. woven fabric, woodgrain, plowed fields).

Much of the previous work on texture analysis and synthesis can be classified according to what type of texture model was used. Some of the successful texture models include reaction-diffusion, frequency domain, fractal, and statistical/random field models. Some have used hybrid models that include a deterministic (or periodic) component and a stochastic component. In spite of all this work, scanned images and hand-drawn textures are still the principle source of texture maps in computer graphics.

This invention focuses on the synthesis of stochastic textures. The approach is motivated by research on human texture perception. Current theories of texture discrimination are based on the fact that two textures are often difficult to discriminate when they produce a similar distribution of responses in a bank of (orientation and spatial-frequency selective) linear filters. The invention described here, therefore, synthesizes textures by matching distributions (or histograms) of filter outputs. This approach depends on the principle that all of the spatial information characterizing a texture image can be captured in the first order statistics of an appropriately chosen set of linear filter outputs. Computational efficiency is one of the advantages of this approach compared with many of the previous texture analysis/synthesis systems. The inventive method involves a sequence of image processing operations: convolution, subsampling, upsampling, histogramming, and nonlinear transformations using small lookup tables. These operations are fast, relatively simple to implement, and amenable to special purpose hardware implementations (e.g., using digital signal processor (DSP) integrated circuits) in lieu of a general purpose computer system.

B. Pyramid Texture Matching

Figure 2:
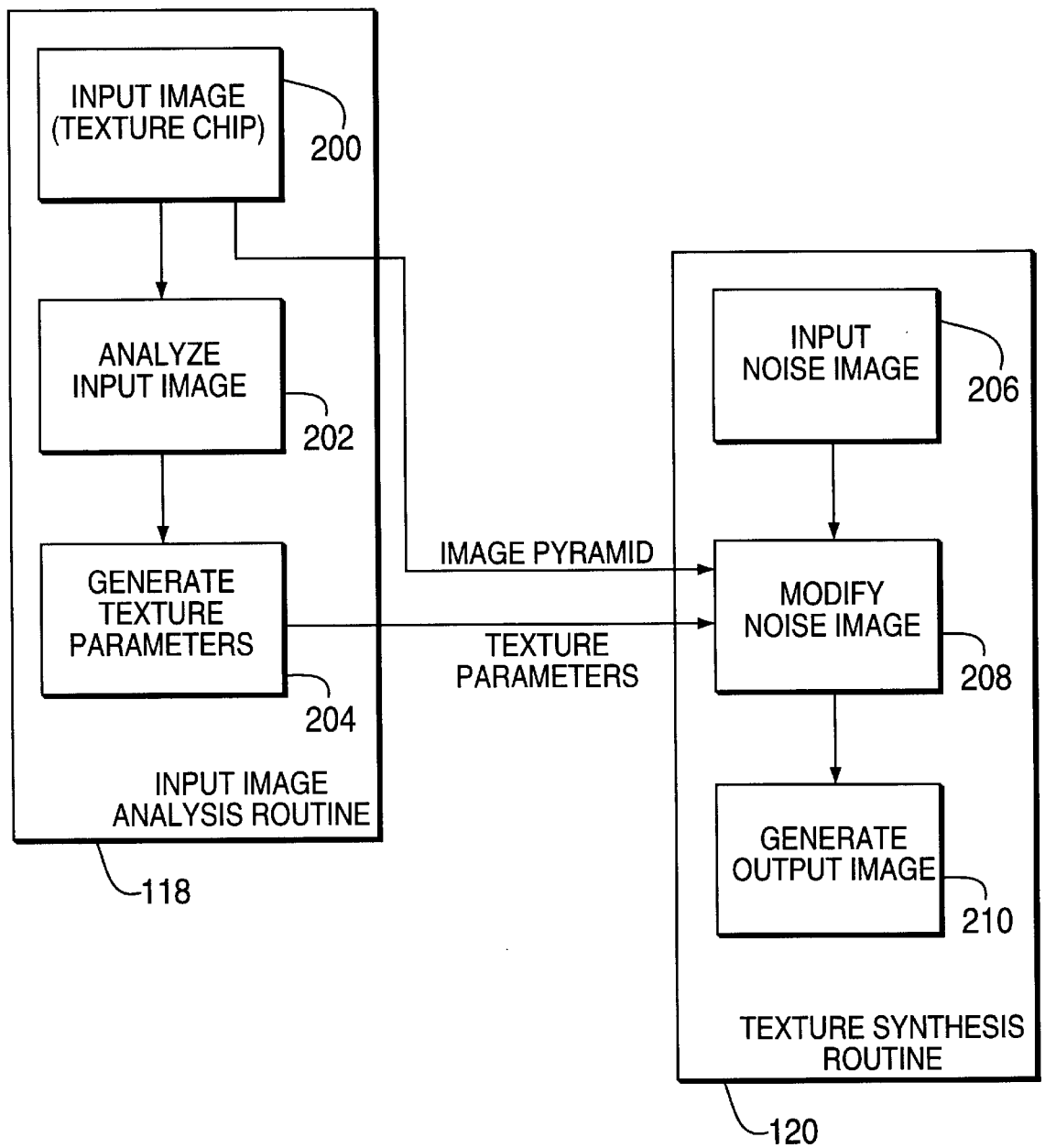
FIG. 2 is a flow chart of an input image analysis routine and a texture synthesis routine used to implement the invention.

FIG. 2 depicts a high-level flow chart of both the input image analysis routine 118 and the texture synthesis routine 120 input image analysis routine starts, at step 200, with an input (digitized) texture image (e.g., a texture chip). The digitized image contains an array of pixels that appear as a texture such as wood grain, sand, gravel, bricks, and the like. The texture chip is analyzed, at step 202, to determine, at step 204, a plurality of texture parameters that represent the texture contained in the texture chip.

The texture synthesis routine 120 begins, at step 206, with a noise image (typically uniform white noise). The noise image is an array of pixels that have randomly generated magnitudes. The size and shape of noise image is not constrained by the invention and is typically user defined to fit a specific graphical surface size and shape. Using the texture parameters from the input image analysis routine, the texture synthesis routine modifies, at step 208, the noise image to make it appear to have the texture of the texture chip. The resulting synthetic image may have any amount of texturing. As shall be discussed below, the foregoing processes are accomplished by making use of an invertible image representation known as an image pyramid, along with an image modification function that matches the histograms of two images. The following detailed discussion of the invention presents examples using two types of pyramids: the Laplacian pyramid (a radially symmetric transform) and the steerable pyramid (an oriented transform). Before discussing the details of the invention, a review of image pyramid construction and collapse is presented.

C. Image Pyramids

A linear image transform represents an image as a weighted sum of basis functions. That is, the image, I(x,y), is represented as a sum over an indexed collection of functions, $g_i(x,y)$:

$$I(x,y) = \sum_i y_i g_i(x,y)$$

where $y_i$ are the transform coefficients. These coefficients are computed from the signal by projecting onto a set of projection functions, $h_i(x, y)$:

$$y_i = \sum_{x,y} h_i(x,y) I(x,y)$$

For example, the basis functions of the Fourier transform are sinusoids and cosinusoids of various spatial frequencies. The projection functions of the Fourier transform are also (co-)sinusoids.

In many image processing applications, an image is decomposed into a set of subbands, and the information within each subband is processed more or less independently of that in the other subbands. The subbands are computed by convolving the image with a bank of linear filters. Each of the projection functions is a translated (or shifted) copy of one of the convolution kernels (see E. P. Simoncelli et al., SUBBAND IMAGE CODING, J. W. Woods, Ed., Klumer Academic Publishers, Norwell, Mass. (1990), for an introduction to subband transforms and image pyramids).

An image pyramid is a particular type of subband transform. The defining characteristic of an image pyramid is that the basis/projection functions are translated and dilated copies of one another (e.g., translated and dilated by a factor of 2 for some integer j). Although image pyramids are typically constructed through use of a factor of 2, any factor may be used. The subbands are computed by convolving and subsampling. For each successive value of j, in the typical implementation, the subsampling factor is increased by a factor of 2. This yields a set of subband images of different, progressive sizes (hence the name image pyramid) that correspond to different frequency bands.

In an independent context, mathematicians developed a form of continuous function representation called wavelets (see G. Strang, Wavelets and Dilation Equations: A Brief Introduction, SIAM 31 (1989), pp. 614–627, for an introduction to wavelets), that are very closely related to image pyramids. Both wavelets and pyramids can be implemented in an efficient recursive manner, as described below, and used interchangeably to implement the present invention.

Laplacian Pyramid.

The Laplacian pyramid is computed using two basic operations: reduce and expand. The reduce operation applies a low-pass filter and then subsamples by a factor of two in each dimension. The expand operation upsamples by a factor of two (padding with zeros in between pixels) and then applies the same low pass filter. A commonly used low-pass filter kernel (applied separably to the rows and columns of image) is: 1/16(1, 4, 6, 4, 1).

One complete level of the pyramid consists of two images. $l_0$ (a low-pass image), and $b_0$ (a high-pass image), that are computed as follows:

$l_0$=Reduce (im)

$b_0$=im−Expand ($l_0$), where im is the original input image. Note that the original image can be trivially reconstructed from $l_0$ and $b_0$:

reconstructed−im=$b_0$+Expand($l_0$).

The next level of the pyramid is constructed by applying the same set of operations to the $l_0$ image, yielding two new images, $l_1$ and $b_1$. The full pyramid is constructed (via a "make-pyramid" function) by successively splitting the low-pass image $l_i$ into two new images, $l_{i+1}$ (a new low-pass image) and $b_{i+1}$ (a new band-pass image).

The combined effect of the recursive low-pass filtering and sub/upsampling operations yields a subband transform whose basis functions are (approximately) Gaussian functions. In other words, the transform represents an image as a sum of shifted, scaled, and dilated (approximately) Gaussian functions. The projection functions of this transform are (approximately) Laplacian-of-Gaussian (mexican-hat) functions, hence the name Laplacian pyramid. Note that the pyramid is not computed by convolving the image directly with the projection functions. The recursive application of the reduce and expand operations yields the same result, but much more efficiently.

The result is a collection of pyramid subband images consisting of several bandpass images and one leftover lowpass image. These images have different sizes because of the subsampling operations; the smaller images correspond to the lower spatial frequency bands (coarser scales). Note that the original image can always be recovered from the pyramid representation (via a "collapse-pyramid" function) by inverting the sequence of operations, as exemplified above.

Steerable Pyramid.

Textures that have oriented or elongated structures are not captured by the Laplacian pyramid generation process because its basis functions are (approximately) radially symmetric.

To synthesize anisotropic textures, the invention uses a steerable pyramid transform. Like the Laplacian pyramid, this transform decomposes the image into several spatial frequency bands. In addition, it further divides each frequency band into a set of orientation bands.

Figure 3:
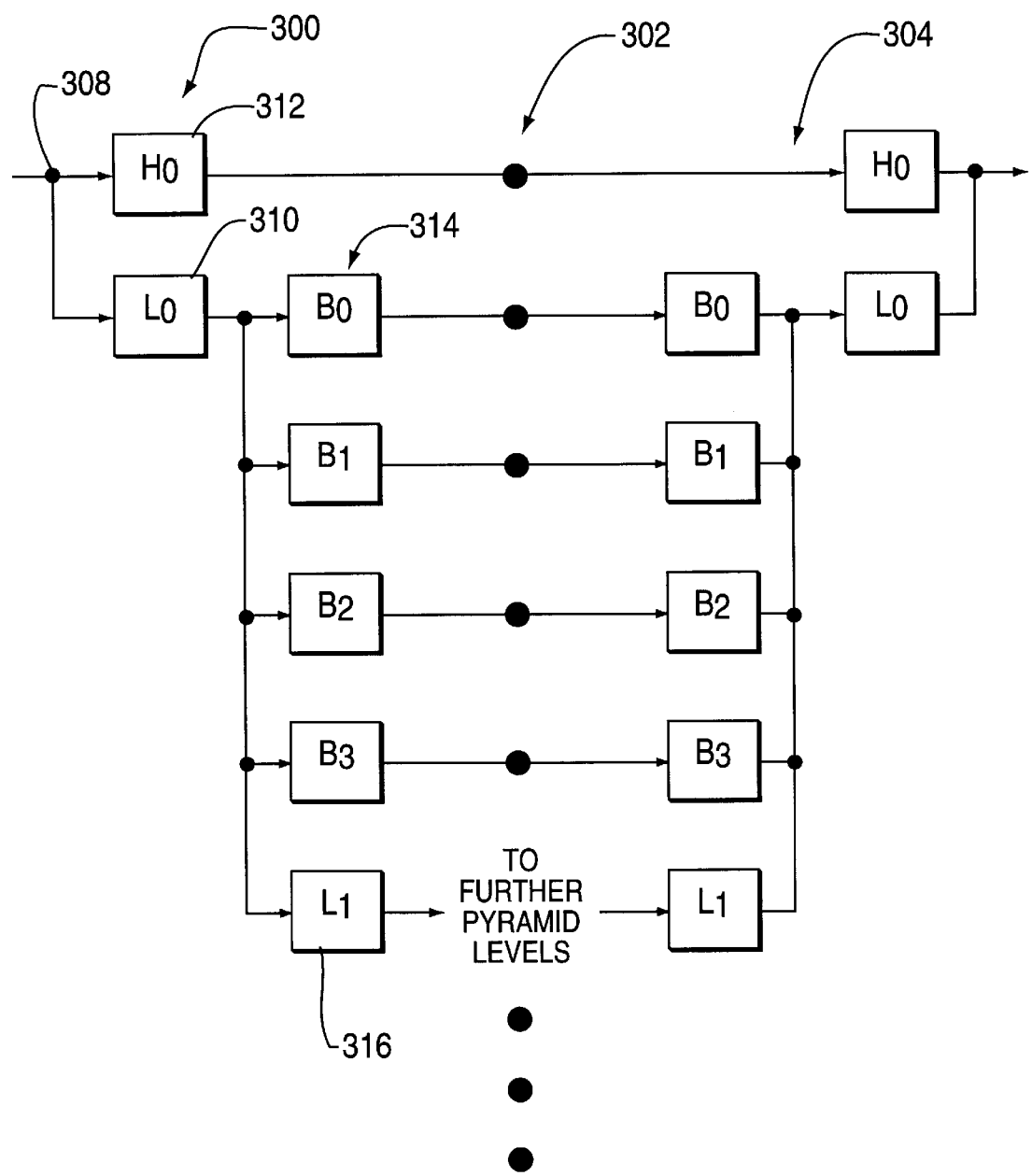
FIG. 3 is a functional block diagram of a transform used to generate a steerable image pyramid.

FIG. 3 shows a functional block diagram of apparatus for computing the steerable pyramid transform. The left-hand side 300 of the figure is an analysis portion (make-pyramid) and the right hand side 304 is a synthesis portion (collapse-pyramid). The circles 302 in between the two portions 300 and 304 represent the decomposed subband images. The transform begins with a high-pass/low-pass split 308 using a low-pass filter with a radially symmetric frequency response and a high-pass filter 312 having a response that corresponds to the four corners of the spatial frequency domain. Each successive level of the pyramid is constructed from the previous level's low-pass band by applying a bank of band-pass filters 314 and a low-pass filter 316.

The orientation decomposition at each level of the pyramid is "steerable", that is, the response of a filter tuned to any orientation can be obtained through a linear combination of the responses of the four basis filters computed at the same location. The steerability property is important because it implies that the pyramid representation is locally rotation-invariant.

The steerable pyramid, unlike most discrete wavelet transforms used in image compression algorithms, is non-orthogonal and over-complete; the number of pixels in the pyramid is much greater than the number of pixels in the input image (note that only the low-pass band is subsampled). This is accomplished to minimize the amount of aliasing within each subband. Avoiding aliasing is critical because this pyramid-based texture analysis/synthesis process treats each subband independently.

The steerable pyramid is self-inverting; the filters in the synthesis portion 304 of the apparatus are the same as those in the analysis portion 300 of the apparatus. This allows the reconstruction (synthesis side) to be efficiently computed despite the non-orthogonality.

Although the steerable pyramid filter kernels are nonseparable, any nonseparable filter can be approximated (often quite well) by a sum of several separable filter kernels. Using these separable filter approximations would further increase the computational efficiency. Software implementations of steerable pyramid generation apparatus are readily available in the art.

Psychophysical and physiological experiments suggest that image information is represented in visual cortex by orientation and spatial-frequency selective filters. The steerable pyramid captures some of the oriented structure of images similar to the way this information is represented in the human visual system. Thus, textures synthesized with the steerable pyramid generally appear noticeably better than those synthesized with the Laplacian pyramid or some other non-oriented representation. Other than the choice of pyramid type, the processes used by the invention are exactly the same.

Returning to FIG. 2, to facilitate input image analysis and texture synthesis the input image as well as the modified noise image are converted into image pyramid representations. The image pyramid conversion of the input image is typically accomplished within the input step (step 200)

while conversion of the modified noise image occurs within step 208. The choice of a steerable pyramid or a Laplacian pyramid or, for that matter, any other pyramid or wavelet representation of the images, depends on the texture being synthesized. For example, a texture having elongated or oriented features may require a steerable pyramid to best represent that image. The specific implementation software used to generate image pyramids and/or wavelet representations of images is well known in the art.

D. Histogram Matching Function

Modification of the noise pyramid is accomplished using a histogram matching function. Histogram matching is a generalization of histogram equalization. The invention takes an image (noise image) and coerces it via a pair of lookup tables to have a particular histogram, e.g., the noise image is modified. The two lookup tables are: (a) the cumulative distribution function (cdf) of one image (noise image), and (b) the inverse cumulative distribution function (inverse cdf) of the other image (texture chip).

An image's histogram is computed by choosing a bin-size (typically, but not necessarily, using 256 bins), counting the number of pixels having magnitudes that fall into each bin, and dividing by the total number of pixels in the image. An image's cdf is computed from its histogram simply by accumulating successive bin counts. As such, a histogram represents the texture of the input image, i.e., the histogram is, in essence, an array of texture parameters.

The cdf is a lookup table that maps from the interval [0,256] to the interval [0,1]. The inverse cdf is a lookup table that maps back from [0,1] to [0,256]. It is constructed by resampling (with linear interpolation) the cdf so that its samples are evenly spaced on the [0,1] interval. Of course, these particular intervals are illustrative and the invention can be used to map between any two arbitrarily selected intervals.

These two lookup tables are used by the match-histogram function to modify an image (im1) to have the same histogram as another image (im2). The match histogram process is repeated until a predefined criterion is met such as the achieving an identity look up table. The following pseudocode illustrates the match histogram function.

Match-histogram (im1, im2)
    im1-cdf=Make-cdf (im1)
    im2-cdf=Make-cdf (im2)
    inv-im2-cdf=Make-inverse-lookup-table (im2-cdf)
    Loop for each pixel do
        im1[pixel]=Lookup (inv-1m2-cdf, Lookup (im1-cdf, im1[pixel]))

PSEUDO CODE 1

Match Histogram Function

E. Texture Synthesis

Figure 4:
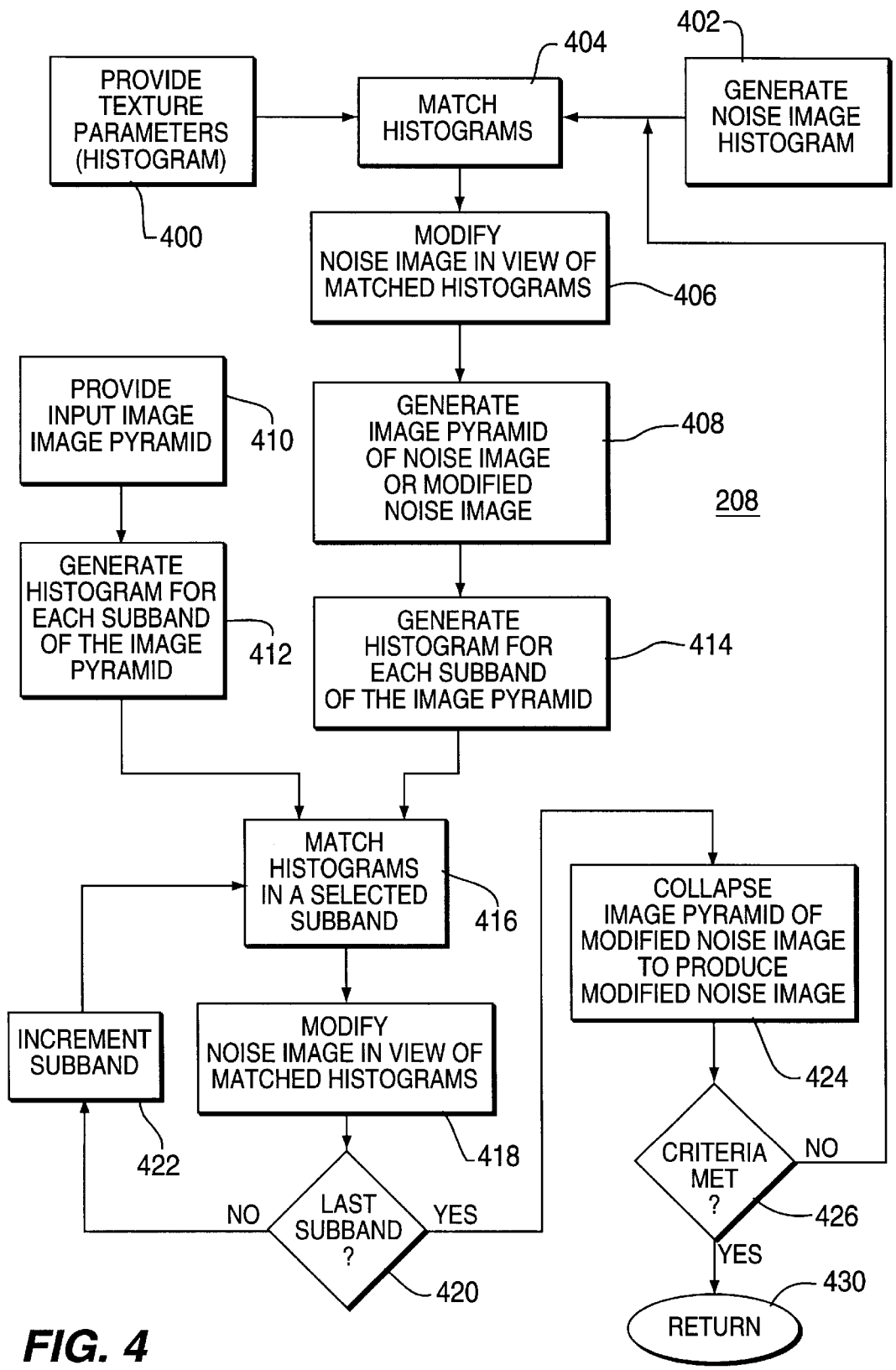
FIG. 4 is a flow chart of a routine that modifies the noise image in response to texture parameters derived from the input image to generate a textured output image.

FIG. 4 depicts a detailed flow chart of the routine that implements a "match-texture" function to iteratively modify an input noise image so that it looks like an input texture image. To accomplish this function, the invention, at step 404, matches the histogram of the noise image (produced at step 402) to the histogram of the input image (provided at step 400 from the input image analysis routine). At step 406, the invention modifies, using PSEUDOCODE 1 above, the noise image to conform it's histogram to the histogram of the input image.

At step 408, the routine generates an image pyramid representation of the modified noise image. Additionally, the image pyramid of the input image is provided at step 410. The image pyramids may be steerable or Laplacian depending upon the content of the texture, i.e., if the texture has elongated or oriented features, a steerable pyramid may be more appropriate.

Respectively at steps 412 and 414, the routine generates a histogram for each level (subband) of each respective pyramid. The routine loops through the two pyramid data structures and matches the histograms of each of the corresponding pyramid subbands. After each matching step (step 416), the routine modifies, at step 418, the subband of the modified noise image to conform its histogram to that of the same subband in the input image. Both the matching and modifying steps are represented in PSEUDOCODE 1 above, where each subband is treated as an image, im1 and im2. At step 420, the routine queries whether histogram of the last subband in the image pyramid of the noise image is being matched to the input image subband. If the query is negatively answered, the routine increments the subband at step 422 and returns to step 416 to process the next subband, e.g., match histogram in the newly selected subband. If the query is affirmatively answered the routine proceeds to step 424 to collapse the pyramid of the modified noise image to form an updated modified noise image that generally represents the texture. At step 426, the routine queries whether a stop criterion has been met such as a look up table approaching or attaining identity values. If this query is negatively answered, the routine returns to step 404, where the modified noise image generated in step 424 is processed in the same manner that the noise image was processed the first time through the loop. In this manner, the routine iteratively updates (corrects) the modified noise image until the stop criterion indicates that the synthesized image contains a texture that is substantially similar to that of the input image. Upon meeting the stop criterion at step 426, the routine returns, at step 430, to the texture synthesis routine of FIG. 2. The foregoing process is illustrated in the following pseudocode, where an a-band is a subband of the analysis pyramid (input image) and the s-band is a subband of the synthesis pyramid (modified noise image).

Match-texture (noise, texture)
    Match-Histogram (noise, texture)
    analysis-pyr=Make-Pyramid (texture)
    Loop for several iterations do
        synthesis-pyr=Make-Pyramid (noise)
        Loop for a-band in subbands of analysis-pyr and for s-band in subbands of synthesis-pyr do
            Match-Histogram (s-band, a-band)
        noise=Collapse-Pyramid (synthesis-pyr)
    Match-histogram (noise, texture)

PSEUDO CODE 2

Match Texture Function

Whenever an iterative scheme of this sort is used there is a concern about convergence. Therefore, stopping execution of the routine after several (five or so) iterations is generally necessary. As is the case with nearly all discrete filters, there are tradeoffs in the design of the steerable pyramid filters (e.g., filter size versus reconstruction accuracy). Since the filters are not perfect, iterating too many times introduces artifacts due to reconstruction error.

The core of the invention is histogram matching which is a spatially local operation. The primary reason that this spatially local operation reproduces the spatial characteristics of textures is that histogram matching is accomplished on a representation that has intrinsic spatial structure. A local modification of a value in one of the pyramid subbands produces a spatially correlated change in the reconstructed image. In other words, matching the pointwise statistics of the pyramid representation does match some of the spatial statistics of the reconstructed image. Clearly, only spatial relationships that are represented by the pyramid basis functions can be captured in this way so the choice of basis functions is important. As mentioned above, the steerable pyramid basis functions are a reasonably good model of the human visual system's image representation and, as such, these basis functions are generally preferred.

Using a complete model of human texture perception could presumably lead to perfect texture matches. By analogy, the present understanding of the wavelength encoding of light in the retina allows matching the color appearance of (nearly) any color image with only three colored lights (e.g., using an RGB monitor). Lights can be distinguished only if their spectral compositions differ in such a way as to produce distinct responses in the three photoreceptor classes. Likewise, textures can be distinguished only if their spatial structures differ in such a way as to produce distinct responses in the human visual system.

F. Edge Handling

Proper edge handling in the convolution operations is also important to accurately synthesizing a texture that will be tiled. For the modified noise image pyramid, the invention uses circular convolution. In other words, for an image (I(x,y) of size N×N, define: I(x,y)=I(x mod N, y mod N). Given that the synthesis starts with a random noise image, circular convolution guarantees that the resulting synthetic texture will tile seamlessly.

For the input image pyramid, on the other hand, circular convolution would typically result in spuriously large filter responses at the image borders. This would, in turn, introduce artifacts in the synthesized texture. A reasonable border handler for the input image pyramid is to pad the image with a reflected copy of itself. Reflecting at the border usually avoids spurious responses (except for obliquely oriented textures).

G. Alternatives

One can imagine a number of other ways to mix/combine texture; to synthesize an image that looks a bit like each of the input textures: apply the match-texture function to a second image that already has a texture rather than noise, combine the high frequencies of one texture with the low frequencies of another, combine two or more textures by averaging their pyramid histograms, and the like.

There is no general way to construct an anisotropic solid texture from a two-dimensional sample. However, there are several options including: (1) constructing a solid texture as the outer product of a two-dimensional anisotropic color texture image and a 1-d (monochrome) signal; (2) composing (adding, multiplying, and the like) several solid textures; (3) starting with an isotropic solid, and introducing anisotropy procedurally; (4) starting with an isotropic solid, and using a paint program to introduce anisotropic "touchups".

Image pyramids and multi-scale image representations of one sort or another are the most often used data structures for antialiased texture mapping. Pyramid-based texture synthesis, therefore, can be naturally integrated into an antialiased texture mapping system.

The invention can be incorporated into an interactive tool for texture synthesis, with a "slider" for each parameter in the pyramid representation. In the current implementation, each subband histogram is encoded with 256 bins. However the subband histograms of many "natural" images have a characteristic shape, suggesting that a very small number of parameters may be sufficient and easily controlled by a tool.

The foregoing embodiment was discussed as generating image pyramids without regard for image color, i.e., processing monochrome images. Those skilled in the art will understand that the invention can be used to process color images by separating each of the images into their constituent color images and producing three pyramids per image, e.g., one pyramid each for red, green and blue (RGB) colors or cyan, magenta, yellow (CMY) colors. All processing of the invention is accomplished on each image pyramid such that three image pyramids of the modified noise image are ultimately produced as output images. These three pyramids are then collapsed and combined to form a final color image as a color texture output image.

Although one embodiment incorporating the teachings of the present invention has been shown and described in detail herein, those skilled in the art can readily devise many other varied embodiments that still incorporate these teachings.

What is claimed is:

1. A method for generating image textures comprising the steps of:

(a) providing a first image having a texture;

(b) providing a second image;

(c) generating an image pyramid of said first image containing a first plurality of first subbands;

(d) generating an image pyramid of said second image containing a second plurality of second subbands, where said first subbands correspond to said second subbands;

(e) determining texture parameters for each of said subbands in said first and second pluralities of subbands;

(f) modifying, in response to the texture parameters of said first plurality of first subbands, said second subbands in said second plurality of second subbands until the texture parameters of said second subbands are substantially the same as the texture parameters of said first subbands to form a modified second image pyramid; and (g) collapsing said modified second image pyramid to form a modified image having a texture that is substantially similar to the texture of said first image.

2. The method of claim 1 wherein said texture parameters comprise a histogram for each of said subbands in said first plurality of first subbands and said second plurality of second subbands.

3. The method of claim 1 wherein said (f) modifying step is performed in a coarse to fine subband order.

4. The method of claim 3 further comprising the step of:

(h) repeating steps (c), (d), (e), (f) and (g) using said modified image as said second image until a predefined criterion is met.

5. A method for generating image textures comprising the steps of:

(a) generating a histogram representing texture parameters of an input image;

(b) generating a histogram representing texture parameters of a noise image;

(c) modifying the noise image histogram to match the input image histogram, wherein said modified noise image attains the histogram of the input image;

(d) generating an image pyramid of said modified noise image containing a plurality of first subbands;

(e) generating an image pyramid of said input image containing a plurality of second subbands;

(f) generating, for each one of said plurality of first subbands, a histogram representing texture parameters of said each one of said plurality of first subbands;

(g) generating, for each one of said plurality of second subbands, a histogram representing texture parameters of said each one of said plurality of second subbands;

(h) selecting a subband from each of said plurality of first and second subbands;

(i) modifying said selected first subband histogram to match said selected second subband histogram, wherein said selected first subband histogram attains the histogram of said selected second subband histogram; and (j) collapsing said modified image pyramid having a modified subband to form a second modified noise image.

6. The method of claim 5 wherein said (h) selecting step is repeated in a coarse to fine subband order and wherein said (i) modifying step is repeated for each selected subband.

7. The method of claim 6 further comprising the step of:

(k) repeating steps (d), (f), (h), (i) and (j) using said second modified noise image as said modified noise image until a predefined criterion is met.

8. The method of claim 1 further comprising the steps of:

providing a noise image;

generating a histogram of said noise image;

generating a histogram of said first image;

modifying said noise image such that said histogram of said noise image matches the histogram of said first image to form said second image.

9. The method of claim 8 wherein said noise image contains either random or pseudo-random noise.

10. The method of claim 1 wherein said second image is a noise image.

11. The method of claim 10 wherein said noise image contains either random or pseudo-random noise.

12. Apparatus for generating image textures having as inputs a first having a texture and a second image, said apparatus comprising:

an image pyramid generator for generating a first image pyramid from said first image having a first plurality of first subbands and a second image pyramid from said second image having a second plurality of second subbands, where said first subbands correspond to said second subbands;

a texture parameter generator, coupled to said image pyramid generator, for producing texture parameters for each of said first and second subbands;

image modifying means, coupled to said texture parameter generator, for altering said second subbands until said texture parameters of each said second subbands are substantially equal to said texture parameters of each of said first subbands to form a modified second pyramid; and a pyramid processor, coupled to said texture parameter generator, for collapsing said modified second pyramid to form a modified second image having the texture of said first image.

13. The apparatus of claim 12 wherein said second image is a noise image.

14. The apparatus of claim 13 wherein said noise image contains either random or pseudo-random noise.

15. The apparatus of claim 12 further comprising means for generating said second image from a noise image including:

means for generating a histogram of said noise image;

means for generating a histogram of said first image;

means for modifying said noise image such that said histogram of said noise image matches the histogram of said first image to form said second image.

16. The apparatus of claim 15 wherein said noise image contains either random or pseudo-random noise.

17. The apparatus of claim 12 wherein said image modifying means operates upon said subbands in a coarse to fine subband order.

* * * * *